US011068300B2

United States Patent
Giral et al.

(10) Patent No.: US 11,068,300 B2
(45) Date of Patent: Jul. 20, 2021

(54) CROSS-DOMAIN TRANSACTION CONTEXTUALIZATION OF EVENT INFORMATION

(71) Applicant: CA, Inc., New York, NY (US)

(72) Inventors: Erhan Giral, Saratoga, CA (US); Tomas Kolda, Prague (CZ)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 16/531,681

(22) Filed: Aug. 5, 2019

(65) Prior Publication Data

US 2019/0354394 A1 Nov. 21, 2019

Related U.S. Application Data

(63) Continuation of application No. 15/718,516, filed on Sep. 28, 2017, now Pat. No. 10,372,482.

(51) Int. Cl.
*G06F 9/46* (2006.01)
*G06F 9/54* (2006.01)
*G06F 9/48* (2006.01)

(52) U.S. Cl.
CPC ............ *G06F 9/466* (2013.01); *G06F 9/4843* (2013.01); *G06F 9/542* (2013.01)

(58) Field of Classification Search
CPC ......... G06F 9/466; G06F 9/4843; G06F 9/542
See application file for complete search history.

(56) References Cited

U.S. PATENT DOCUMENTS

| 7,194,664 | B1 | 3/2007 | Fung et al. | |
|---|---|---|---|---|
| 7,243,306 | B1 * | 7/2007 | Joshi | G06F 8/10 707/999.001 |
| 7,337,184 | B1 * | 2/2008 | Or | G06F 16/252 |
| 7,458,072 | B2 | 11/2008 | Moorthy et al. | |
| 7,610,293 | B2 | 10/2009 | Vedula | |

(Continued)

OTHER PUBLICATIONS

Cantania, et al., "Web Services Management Framework—Overview (WSMFOverview) Version 2.0", 2003, 20 pages.

(Continued)

*Primary Examiner* — Phillip H Nguyen
(74) *Attorney, Agent, or Firm* — Foley & Lardner LLP

(57) ABSTRACT

A topology-based transversal analysis service has been created that correlates topologies of different domains of a distributed application and creates cross-domain "stories" for the different types of transactions provided by the distributed application. A "story" for a transaction type associates an event(s) with a node in an execution path of the transaction type. This provides context to the event(s) with respect to the transaction type ("transaction contextualization") and their potential business impact. The story is a journal of previously detected events and/or information based on previously detected events. The events have been detected over multiple instances of a transaction type and the journal is contextualized within an aggregate of execution paths of the multiple instances of the transaction type. The story can be considered a computed, ongoing narrative around application and infrastructure performance events, and the narrative grows as more performance-related events are detected.

17 Claims, 8 Drawing Sheets

(56) References Cited

U.S. PATENT DOCUMENTS

| | | | |
|---|---|---|---|
| 8,031,634 B1* | 10/2011 | Artzi | H04L 12/4641 |
| | | | 370/254 |
| 8,396,929 B2 | 3/2013 | Helfman et al. | |
| 8,832,665 B2 | 9/2014 | Greifeneder et al. | |
| 9,021,505 B2 | 4/2015 | Shankaranarayanan et al. | |
| 9,246,773 B2* | 1/2016 | Degioanni | H04L 41/22 |
| 9,774,600 B1* | 9/2017 | Streete | G06F 21/45 |
| 10,187,260 B1* | 1/2019 | Chen | G06F 9/45558 |
| 2004/0046785 A1 | 3/2004 | Keller | |
| 2011/0004564 A1* | 1/2011 | Rolia | G06Q 10/067 |
| | | | 705/348 |
| 2011/0154367 A1 | 6/2011 | Gutjahr et al. | |
| 2011/0307590 A1* | 12/2011 | Mogalayapalli | G06F 9/485 |
| | | | 709/223 |
| 2013/0097304 A1* | 4/2013 | Asthana | H04L 41/5006 |
| | | | 709/224 |
| 2013/0179448 A1 | 7/2013 | Dixon et al. | |
| 2013/0227121 A1 | 8/2013 | Dixon et al. | |
| 2014/0189435 A1* | 7/2014 | Manuel-Devadoss | G06F 11/3495 |
| | | | 714/43 |
| 2015/0280969 A1* | 10/2015 | Gates | G06F 11/30 |
| | | | 714/37 |

OTHER PUBLICATIONS

Erlingsson, et al., "Fay: Extensible Distributed Tracing form Kernels to Clusters", ACM Transactions on Computer Systems, vol. 30, No. 4, Art. 13, 11/12, 35 pgs., Nov. 2012, 35 pages.

Schnorr, et al., "Interactive Analysis of Large Distributed Systems with Scalable Topology-based Visualization", INRIA MESCAL Research Team, CNRS LIG Laboratory, University of Grenoble, 2013, 10 pages.

Van Hoorn, et al., "Continuous Monitoring of Software Services: Design and Application of the Kieker Framework", Christian-Albrechts-Universitat Zu Kiel, Bericht Nr. 0921, Nov. 2009, 27 pgs., 11/09, 27 pages.

* cited by examiner

US 11,068,300 B2

CROSS-DOMAIN TRANSACTION CONTEXTUALIZATION OF EVENT INFORMATION

CROSS-DOMAIN TRANSACTION CONTEXTUALIZATION OF EVENT INFORMATION

BACKGROUND

The disclosure generally relates to the field of data processing, and more particularly to generic control systems or specific applications.

Generally, a distributed application is an application that includes software components that are distributed across multiple networked host machines which may be physical machines or virtual machines. The distributed application presents a single interface to a client for requesting a transaction to be performed. Performing the transaction includes performing multiple operations or tasks, or "end-to-end" tasks of the transaction. Each of the distributed software components handles a different subset of those tasks. This application architecture allows for a more flexible and scalable application compared with a monolithic application.

With the rise of cloud computing and mobile devices, large-scale distributed applications with a variety of components including web services and/or microservices have become more common. Various distributed tracing tools have been developed to perform root cause analysis and monitoring of large-scale distributed applications. A distributed tracing tool traces the execution path of a transaction across the software components of a distributed application. As the software components are executed (e.g., remote procedure calls, remote invocation calls, application programming interface (API) function invocations, etc.), identification of the component is recorded and the sequence of calls/invocations are correlated to present the execution path.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody the disclosure. However, it is understood that this disclosure may be practiced without these specific details. In other instances, well-known instruction instances, protocols, structures and techniques have not been shown in detail in order not to obfuscate the description.

Overview

A large-scale distributed application can include software components distributed across an infrastructure comprised of hundreds to thousands of machines (e.g., servers, storage arrays, routers, etc.). With the software components and infrastructure, the distributed application provides different types of transactions to clients (e.g., catalog search, inventory update, purchasing, etc.). Some of the software components and infrastructure may be managed by an entity other than the entity offering/managing the distributed application. For instance, a software component of a distributed application may be third-party web service or might be running on infrastructure managed by a third-party such as a cloud provider. Furthermore, different tools are likely deployed for monitoring different domains of the distributed application. In the case of different domains corresponding to different layers (e.g., layers of the Open Systems Interconnection (OSI) reference model or OSI stack), a collection of agents and/or instrumented code may monitor an application layer while a network monitoring tool monitors a physical and network layer. While distributed tracing can help analyze an issue arising within the application layer of a distributed application, the information from the relevant components of the lower layers can improve this analysis.

A topology-based domain transversal analysis service has been created that correlates topologies of different domains of a distributed application and creates cross-domain "stories" for the different types of anomalies observed on the distributed application. Creating a "story" for a transaction type involves associating an event(s) with a node in an execution path of the transaction type. This provides context to the event(s) with respect to the transaction type ("transaction contextualization"). The story is a journal (i.e., historical accounting) of correlated performance-related events observed on the aggregate execution path of numerous instances of the transaction type. A cross-domain story associates events from multiple domains of the distributed application across numerous instances of the transaction type. Thus, the service not only contextualizes events from different domains with respect to a transaction type but also with respect to entities of the different domains.

Example Illustrations

Figure 1:
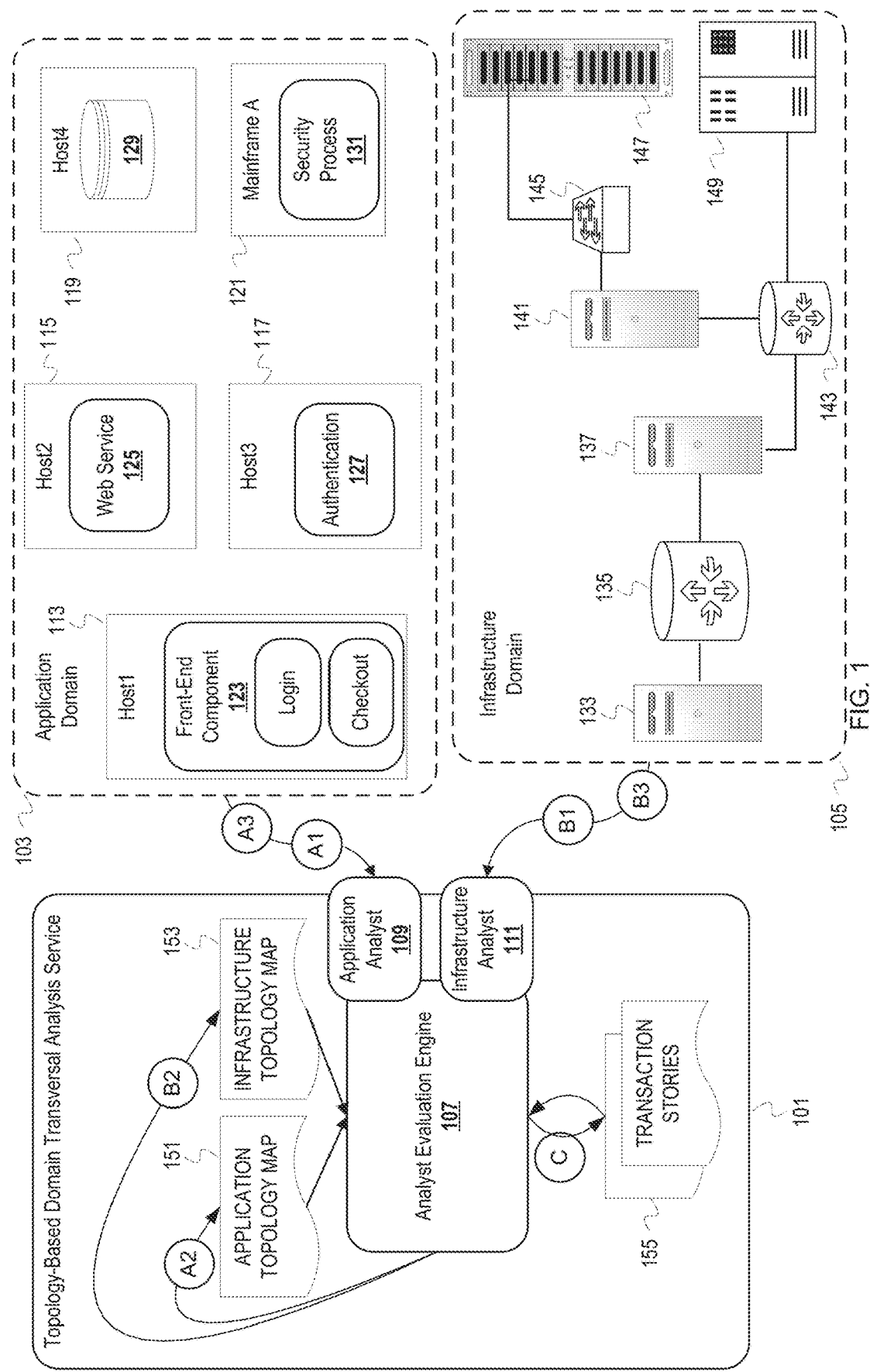
FIG. 1 is a conceptual diagram of the topology-based domain transversal application analysis service analyzing information from different domains of the distributed application.
Figure 2:
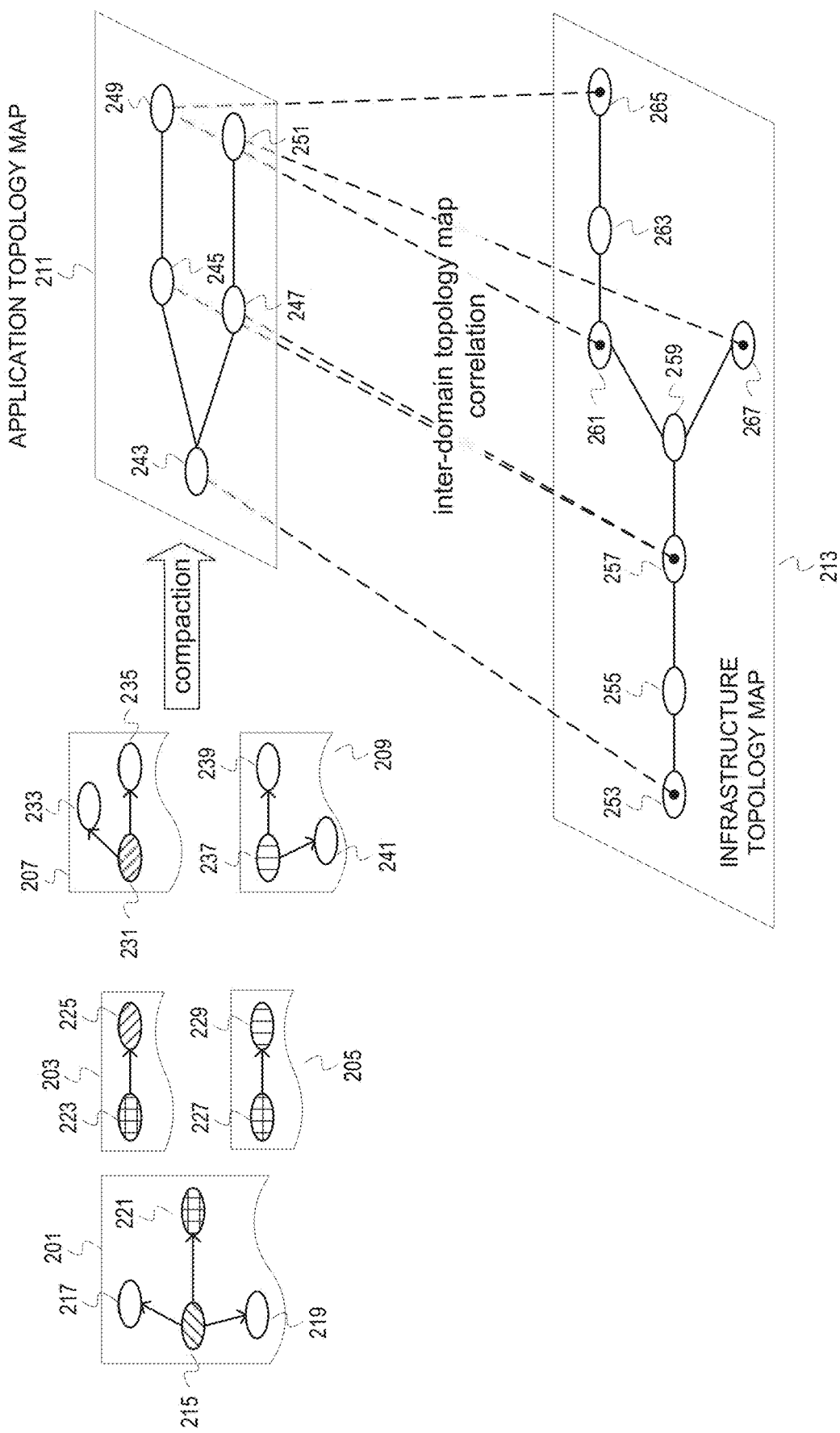
FIG. 2 is a conceptual diagram of example topology maps and correlations between them.
Figure 3:
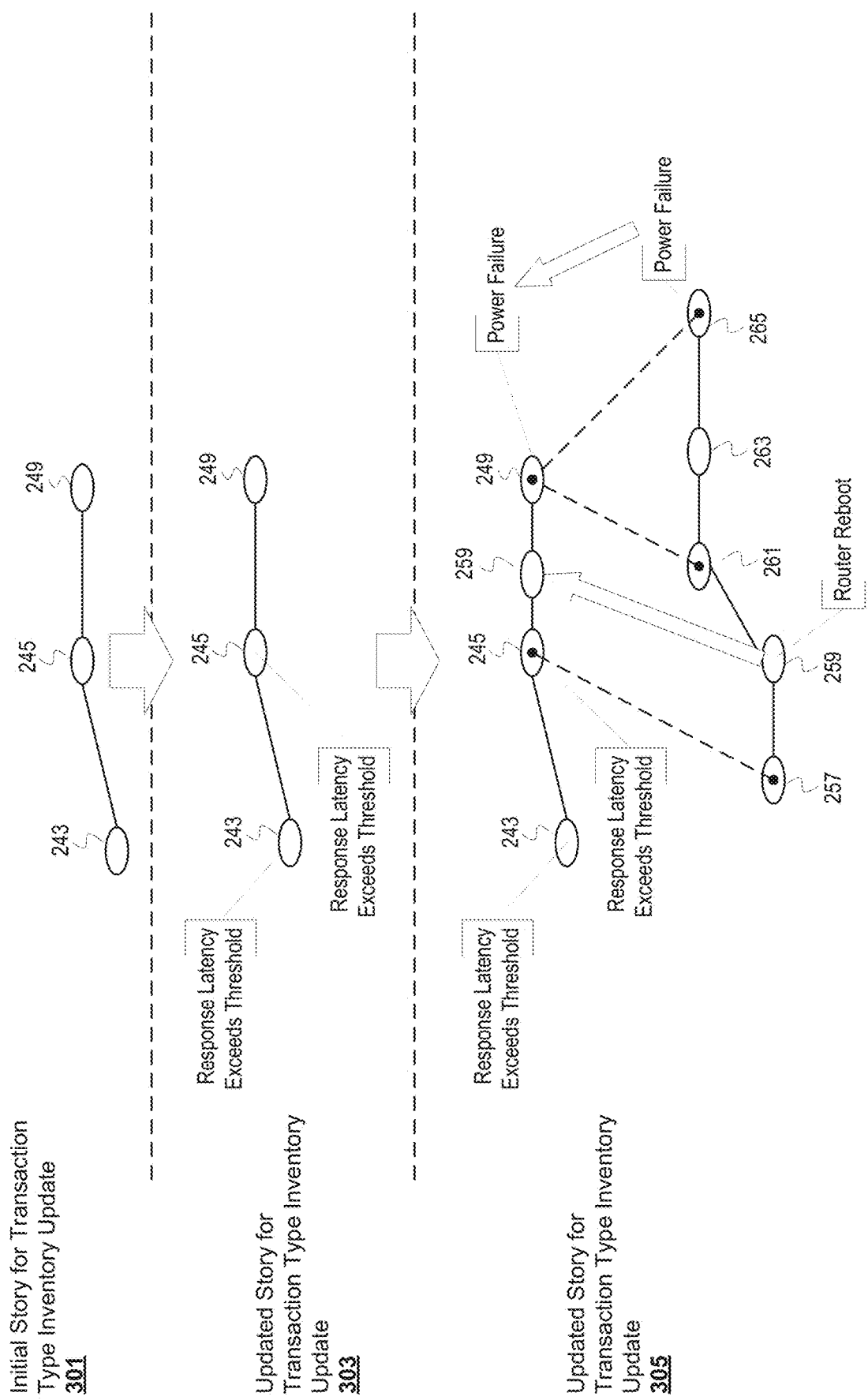
FIG. 3 is a conceptual diagram that illustrates an example ongoing story for a transaction of type inventory update.

FIGS. 1-3 are conceptual diagrams of a topology-based domain transversal analysis service generating transaction stories based on information related to a distributed application. The distributed application is deployed across a distributed system referred to herein as an infrastructure since the distributed system supports the distributed application. As examples of support, components of the distributed application are installed on computers in the distributed system and network elements handle communications among the computers.

FIG. 1 is a conceptual diagram of the topology-based domain transversal application analysis service analyzing information from different domains of the distributed application. An application domain 103 is a logical layer of software components of the distributed application (e.g., web servers, microservices, software interfaces, databases, etc.). Several software components are depicted as residing in the application domain 103: a front-end component 123, a web service 125, an authentication service 127, a database 129, and a security process 131. The front-end component 123 provides various types of business transactions for a distributed application being monitored. Examples of the types of business transactions for a distributed application include checkout, inventory update, and login. These business transactions correspond to the different named use cases of the distributed application. An infrastructure domain 105 includes hardware or infrastructure elements (e.g., servers, routers, switches, storage arrays, etc.). The hardware elements that inhabit the infrastructure domain 105 include: a server 133, a router 135, a server 137, a router 143, a server 141, a network switch 145, a storage array 147, and a mainframe 149. The router 135 communicatively couples the servers 133, 137. The router 143 communicatively couples the servers 133, 141 and the mainframe 149. The switch 145 communicatively couples the server 141 with the storage array 147.

A topology-based domain transversal application analysis service 101 ("cross-domain analyzer") collects information from the application domain 103 and the infrastructure domain 105 for cross-domain analysis. The cross-domain analyzer 101 comprises multiple components: an analyst evaluation engine 107, an application analyst 109, and an infrastructure analyst 111. The analysts 109, 111 correspond to the different domains. Connections are established between data sources of the different domains (e.g., monitoring tools, agents, etc.) and the analysts 109, 111. After being set up, the analysts 109, 111 can publish information (e.g., service addresses, APIs, etc.) that facilitate establishing the connections for communicating information of the different domains. In this illustration, the application analyst 109 will collect (receive or retrieve) information from the application domain 103, and the infrastructure analyst will collect (receive or retrieve) information from the infrastructure domain 105. This collecting will be ongoing. The analysts 109, 111 process the collected information based on rules and/or heuristics that correspond to the respective domain. Based on the processing, each of the analysts 109, 111 may discard or filter its collected information, or generate output. For example, an instrument of the front-end component 123 may evaluate response latency against multiple thresholds and communicate to the application analyst 109 events indicating when these thresholds are exceeded. The application analyst 109 may filter some of these events out and output a selected one for consumption by the analyst evaluation engine 107. To generate the output, the analysts 109, 111, may collect additional information (e.g., additional performance measurements and/or historical information) based on the rule or heuristic being applied. In some cases, an analyst may generate output by passing through collected information.

The analyst evaluation engine 107 fulfills two responsibilities: 1) maintain topology maps per domain, and 2) create and maintain transaction stories for the different types of transactions offered by the distributed application. The analyst evaluation engine 107 is referred to as an "engine" because it can be implemented as a program that continuously runs after instantiation (including running in an idle state) to monitor for input, collect detected input, generate the transaction stories, revise the transaction stories, generate topology maps, and revise topology maps. To maintain topology maps per domain, the analyst evaluation engine 107 uses relationship and dependency information provided by the analysts 109, 111. While a topology map for a domain may be stable (e.g., the infrastructure domain 105), a topology map for any domain is likely dynamic to some extent. In the infrastructure domain 105, hardware can be added, replaced, or removed. In the application domain 103, states of services can frequently change and components can be updated and migrated. To create and maintain transaction stories, the analyst evaluation engine 107 determines correlations between nodes in the different topology maps and uses the output from the analysts 109, 111 and topology maps to associate information with nodes in light of cross-domain correlations. Thus, the analyst evaluation engine 107 can generate a transaction story for a transaction type that associates an event detected in the infrastructure domain 105 with a node in the application domain 103. This cross-domain association of an infrastructure event contextualizes the infrastructure event with respect to a transaction type. The resulting transaction story may indicate a correlation between an event within the infrastructure domain 105 and one or more events within the application domain 103.

FIG. 1 is annotated with a series of stage identifiers A1-A3, B1-B3, and C. Each stage represents one or more operations. Although these stages are ordered for this example, the stages illustrate one example to aid in understanding this disclosure and should not be used to limit the claims. Subject matter falling within the scope of the claims can vary with respect to the order and some of the operations. The stages will be described with reference to FIGS. 2-3, as well as FIG. 1.

At stage A1, the application analyst 109 collects information about topology of the distributed application from the application domain 103. Agents or instrumented code on components of the distributed application can generate local graphs (or sub-graphs from the perspective of the distributed application) based on interactions between software components. The interactions may be calls, invocations, messages, etc. For simplicity, this description refers to all interactions as "calls" since calls can be local function calls, remote calls or remote invocations that use hypertext transfer protocol (HTTP) requests, API function calls, etc. The calls are represented as call dependencies or dependencies between callers and callees.

At stage A2, the collected call dependencies are used to generate an application topology map 151. The application analyst 109 can process the collected information (e.g., remove local dependencies and leave calls to external software components) or pass it through to the analyst evaluation engine 107. The application analyst 109 may indicate (e.g., tag) the collected information as topological information for the analyst evaluation engine 107 to use for topological map construction. The analyst evaluation engine 107 determines boundaries of call sub-graphs to identify externally visible nodes of the application domain 105 and connects the nodes to construct the application topology map 151. The analyst evaluation engine 107 or the application analyst 109 may preserve some or all local call sub-graphs for a more comprehensive application topology map 151. The analyst evaluation engine 107 can preserve information in the application topology map 151 to distinguish between internal call dependencies and external call dependencies.

FIG. 2 is a conceptual diagram of example topology maps and correlations between them. A group of sub-graphs are conceptual depictions of call sub-graph information communicated from the application domain 103. A call sub-graph 201 represents the call dependencies corresponding to the front-end interface 123. The front-end interface 123 can include several processes and/or local services on a host 113 "Host1." As examples, the processes and/or local services can include a process that validates form of a request, a local service that presents an authentication challenge, etc. In the sub-graph 201, a node 215 represents a process of the front-end interface 123 that receives requests; a node 217 and a node 219 represent local services that have call dependencies with the node 215; and the node 221 represents a process of the front-end interface 123 that that has an internal call dependency with the node 215 and makes external calls (i.e., makes a call to a remote component(s)). A call sub-graph 203 represents the call dependencies corresponding to the web service 125 running on a host 115 "Host2." In the sub-graph 203, a node 223 has an external call dependency with the node 221 as represented by the matched hashing. A node 225 of the sub-graph 203 has a local call dependency on the node 223 and makes external calls. A call sub-graph 205 represents the call dependencies corresponding to the authentication service 127 running on a host 117 "Host3." In the sub-graph 205, a node 227 has an external call dependency with the node 221 as represented by the matched hashing. A node 229 of the sub-graph 205 has a local call dependency on the node 227 and makes external calls. The sub-graph 207 corresponds to the database 129 running on a host 119 and identified as "Host4." In the sub-graph 207, a node 231 has an external call dependency with the node 225 as represented by the matched hashing. A node 233 of the sub-graph 207 has a local call dependency on the node 231 and a node 235 also has a local call dependency on the node 231. The sub-graph 207 corresponds to the security process 131 running on a mainframe 212 identified as "Mainframe A." In the sub-graph 209, a node 237 has an external call dependency with the node 229 as represented by the matched hashing. A node 239 of the sub-graph 209 has a local call dependency on the node 237 and a node 241 also has a local call dependency on the node 237.

FIG. 2 depicts the internal and external call dependencies different to represent how the information is captured differently. For internal call dependences, an agent or instrument can access a call stack that is maintained locally as part of the operating system and/or use process identifier or stack pointers to determine call dependencies. Thus, sub-graph information can contain the dependency information. For external call dependencies, the calling process includes a self-identifying identifier in the message that conveys the call. The identifier can be a combination of a process identifier and the host identifier since a host may have multiple processes making external calls. An agent or instrument of the callee process records the caller identifier and includes this information in the sub-graph information provided for construction of a topology map, which allows asynchronously connected sub-graphs to be pieced together. In this illustration, the cross-domain analyzer 101 identifies "boundaries" of the sub-graphs and compacts the sub-graphs 201, 203, 205, 207, 209 of the application domain 103 to construct or form an application topology map 211.

The cross-domain analyzer 101 can identify boundaries based on how the dependency information has been captured and/or on the content of the dependency information. For instance, the cross-domain analyzer 101 can be programmed or trained to recognize host identifiers based on field placement within a data structure that represents a node in a sub-graph, based on structure of the identifiers, or based on format of the identifiers. And the cross-domain analyzer 101 can be programmed/trained to use host identifiers as boundaries for compaction of sub-graphs. Detection of boundaries can be used for both compaction and edge creation in the application topology map 211. Using FIG. 2 as an illustration, the cross-domain analyzer 101 may collect the sub-graph 203 prior to the sub-graph 201. In that case, the cross-domain analyzer 101 recognizes in the call dependency information of the node 223 that the caller identifier indicates "Host1_FE" and that a string before an underscore in a caller identifier represents a host, as an example. The cross-domain analyzer 101 is assumed to recognize a host as a boundary. Thus, the cross-domain analyzer 101 recognizes a boundary for the sub-graph 203. The cross-domain analyzer 101 then traverses the sub-graph 203 from the (root) node 223 to determine whether there are any other boundaries based on external callers. The cross-domain analyzer 101 compacts the sub-graph 203 into a node 245 to represent an externally visible software component in the application topology map 211.

Afterwards, the cross-domain analyzer 101 collects the sub-graph 201 and performs a similar process. The cross-domain analyzer traverses the sub-graph 201 from (root) node 215. As the caller of the node 215 is external to the distributed application, the caller identifier indicates a client identifier that the cross-domain analyzer 101 may or may not recognize as a boundary. The cross-domain analyzer 101 compacts the sub-graph 201 into a node 243 in the application topology map 211. The cross-domain analyzer 101 then adds an edge to connect the nodes 243, 245 in the application topology map 211 based on the previously recognized boundary. The cross-domain analyzer 101 performs similar operations on the other sub-graphs to "finish" constructing the application topology map 211: sub-graph 205 is compacted into node 247 and connected to the node 243; sub-graph 207 is compacted into a node 249 and connected to the node 245; and the sub-graph 209 is compacted into a node 251 which is connected to the node 247. Construction of the application topology map 211 isn't actually finished because the topology is dynamic, as previously stated. However, the application topology map 211 can reach an initial state to be stored as the application topology map 151. This initial state can be based on a configured criterion (e.g., number of edges and/or nodes, number of sub-graphs, collection intervals, etc.).

Returning to FIG. 1, at stage B1, the infrastructure analyst 111 collects information about topology of the distributed application from the infrastructure domain 105. The infrastructure analyst 111 can load configuration information that indicates topology of the infrastructure domain 105. This information can be loaded from a data source that may have been created by an administrator or tool (e.g., simple network management protocol (SNMP) based tool).

At stage B2, the collected configuration/network information are used to generate an infrastructure topology map 153. The infrastructure analyst 111 can process the collected information or pass it through to the analyst evaluation engine 107 for construction of the infrastructure topology map 153. The infrastructure analyst 111 may indicate (e.g., tag) the collected information as topology information for the analyst evaluation engine 107 to use for topological map construction.

FIG. 2 also depicts an example infrastructure topology map 213 corresponding to the infrastructure topology map 153. The cross-domain analyzer 101 can construct the map 213 for the infrastructure topology in a more straightforward manner than the application topology map 211. The cross-domain analyzer 101 constructs the infrastructure topology map 213 to reflect the layout of the infrastructure domain 105. The network/configuration information will indicate the relationships between infrastructure elements and guide construction of the infrastructure topology map 213. The infrastructure topology map 213 includes nodes 253, 255, 257, 259, 261, 263, 265 which respectively represent the server 133, the router 135, the server 137, the router 143, the server 141, the switch 145, the storage array 147, and the mainframe 149. The connections among the nodes of the infrastructure map 213 reflect the connections among the infrastructure elements in the infrastructure domain 105: nodes 253, 255 are connected; nodes 255, 257 are connected; nodes 257, 261 and the node 267 are connected to the node 259; the nodes 261, 263 are connected; and the nodes 263, 265 are connected.

When constructing the topology maps, the cross-domain analyzer 101 includes information for each of the nodes. Examples of this information include component identifier and one or more attributes (e.g., type of component represented by the node, model number, etc.). The cross-domain analyzer 101 may also maintain information for each of the edges, such as type of relationship. In the application topology map, an edge may indicate an HTTP communication, representational state transfer (REST)ful call, or API function call as the type of relationship. In the infrastructure topology map 213, an edge may indicate different types of connectivity relationships (e.g., an Ethernet connection, wireless connection, Fibre Channel connection, etc.). For each node, the cross-domain analyzer 101 also maintains information for correlating nodes across different topology maps. For instance, host identifiers or network addresses can be used to correlate nodes across topology maps of different domains. A data source provider of a domain can provide multiple values as possible values for node correlation, and the cross-domain analyzer can search across maps for matches or approximate matches of candidate correlation values. Embodiments can also discover node correlation values without them being specified in a particular variable or field. A node correlation variable or field may be discovered based on formatting of the value or a description/tag for the field or value. For example, a descriptor or tag for a field or variable can indicate it as a candidate for correlation. A field(s) can also be reserved for a correlation value(s). Since the topology maps are dynamic, the correlations are likely not maintained in a persistent store. For example, the cross-domain analyzer 101 can maintain the topology maps in different tables or stores and submit queries (e.g., a join) across the maps to find correlations, and then use the correlations in generating or updating a transaction story. However, embodiments may maintain a separate store/table of correlations to use for story generation/updating and then validate the correlations in case a topology map has changed since the node correlations were stored.

Returning to FIG. 1, the analysts 109, 111 detect events from their respective domains and generate outputs/interpretations for consumption by the analyst evaluation engine 107. The application analyst 109 detects an event from the application domain 103 at stage A3. For example, latency for responding to a client request may exceed a defined threshold for the front-end component or a query to the database 129 may fail. For the infrastructure domain 105, the infrastructure analyst 111 detects an event from the infrastructure domain 105 at a stage B3. For example, the infrastructure analyst 111 detects a low memory alert or packet loss alert. The analysts process the events to generate analyst outputs as previously described.

At stage C, the analyst evaluation engine 107 contextualizes the analyst outputs with respect to a type of transaction. The evaluation engine 107 retrieves the analyst outputs from the analysts 109, 111, and adds a transaction story to transaction stories 155 or updates a transaction story of the transaction stories 155. The analyst evaluation engine 107 determines which node in the application topology map 151 corresponds to the output of the application analyst 109 based on the information of the output. For instance, evaluation engine 107 searches the application topology map 151 for a node based on a software component identifier in the output from the application analyst 109. The analyst evaluation engine 107 then searches the transaction stories 155 for an execution path that includes the determined node, and associates the output of the application analyst 109 with the determined node in the matching one(s) of the transaction stories 155. Since transaction stories correspond to the application domain 103, analyst evaluation engine 107 correlates the application topology map 151 and the infrastructure topology map 153 to migrate/share information from the infrastructure domain 105 to the application domain 103. FIG. 2 illustrates an example inter-domain map correlation.

In the example illustration of FIG. 2, the cross-domain analyzer 101 correlates nodes of the application topology map 211 and the infrastructure topology map 213. This can be done after map constructions or after map updates, but is more likely performed when a transaction story operation has been triggered. The cross-domain analyzer 101 determines that the server 133 hosts the front-end component 123 based on correlation of host identifiers of the front-end component 123 and the server 133, which leads to correlation of the nodes 243, 253. The cross-domain analyzer 101 determines that the server 137 hosts both the web service 125 and the authentication service 127. The web service 125 and the authentication service 127 are running on virtual machines that are hosted on the server 137. The cross-domain analyzer 101 can correlate the host identifiers of each service with a host name or any other sufficiently unique attribute of the virtual machines that can be correlated with another domain. A sufficiently unique attribute would be one that uniquely identifies a host within the infrastructure regardless of uniqueness outside of the infrastructure. Correlation of host identifiers may involve additional queries triggered by the cross-domain analyzer 101 recognizing the service host identifiers as likely corresponding to virtual machines, or the sub-graphs 203, 205 can include information that describes the virtualization stack for the web service 125 and for the authentication service 127. The cross-domain analyzer 101 then correlates a host identifier of the virtual machine manager (e.g. hypervisor) that supports the virtual machines with the host identifier of the server 137, which correlates the node 257 with both nodes 245, 247. The cross-domain analyzer 101 determines that database 129 is supported by the storage array 147 and the server 141. The cross-domain analyzer 101 can determine from the configuration information of the infrastructure domain 105 that the server 141 manages the storage array 147. The cross-domain analyzer 101 also determines that the database 129 is running on the server 141 based on correlation of host identifiers between the database 129 and the server 141. With this information, the cross-domain analyzer 101 can correlate the nodes 261, 265 with the node 249. The cross-domain analyzer 101 determines that the mainframe 149 hosts the security process 131 based on correlation of host identifiers of the security process 131 and the mainframe 149, which leads to correlation of the nodes 267, 251.

Returning to FIG. 1, the analyst evaluation engine 107 uses the inter-domain map node correlations to determine a node in the application topology map 151 that correlates to a node in the infrastructure topology map 153. The analyst evaluation engine 107 has already identified the infrastructure node in the infrastructure topology map 153 as corresponding to the output from the infrastructure analyst 111. The analyst evaluation engine 107 can then search the transaction stories 155 for an execution path that includes the correlated application node from the application topology map 153. As with the output of the application analyst 109, the analyst evaluation engine 107 can then associate the infrastructure analyst output with the correlated application topology map node in the matching one(s) of the transaction stories 155.

FIG. 3 is a conceptual diagram that illustrates an example ongoing story for a transaction of type inventory update. When a first instance of an inventory update transaction is detected, the analyst evaluation engine 107 creates a transaction story 301 for that transaction type based on the execution path of the particular transaction instance. The initial transaction story 301 has an execution path that includes nodes 243, 245, 249 of the application topology map 211. The execution paths of subsequent instances of the inventory update transaction type can vary to some extent. For instance, an initial transaction for a user may include nodes corresponding to authentication and authorization. Subsequent instances may not include those nodes because the transaction requests carry a cookie or certificate from the previous authentication.

At a later point, the analyst evaluation engine 107 collects as input outputs from the application analyst 109 that indicate a response latency threshold has been exceeded at the software components corresponding to nodes 243, 245. The analyst evaluation engine 107 matches the application analyst output with the transaction story 301 based on the execution path of the transaction story 301 including nodes 243, 245. The analyst evaluation engine 107 then associates the output with the nodes 243, 245 within the transaction story 301 to generate an updated transaction story 303.

The analyst evaluation engine 107 also collects as input the output from the infrastructure analyst 111. This output indicates a power failure in the storage array 147 that corresponds to the node 265 in the infrastructure topology map 213. The infrastructure analyst output also indicates a reboot occurred at the router 143, which corresponds to the node 259 in the infrastructure topology map 213. The analyst evaluation engine 107 determines correlations between the nodes of the two maps 211, 213. One of the node correlations includes the correlation between the infrastructure node 261 and the application node 249 based on, for example, a host identifier or network address. The analyst evaluation engine 107 traverses the infrastructure topology map 213 from the infrastructure node 265 associated with the power failure to the correlated infrastructure node 261. The analyst evaluation engine 107 performs this traversal based on information in the infrastructure topology map 213 that indicates a relationship between nodes 261, 265 (i.e., the server 141 manages the storage array 147). Based on the correlation of the nodes 261, 249 and information in the infrastructure topology map 213, the analyst evaluation engine 107 associates the power failure with the application node 249, which corresponds to the database 129. Thus, the transaction story 301 is updated to associate the power failure of the storage array 147 with the database 129.

The other input is the infrastructure event that a reboot occurred at the router 143. The router 143 is represented by the infrastructure node 259. Based on the infrastructure node 259 being a router, the analyst evaluation engine 107 incorporates the node 259 into the execution path of the transaction story between application nodes 245, 249. The node 259 is incorporated because it doesn't correlate to a node in the application topology map 211, but can impact multiple application nodes. Therefore, the analyst evaluation engine 107 incorporates the infrastructure node 259 between application nodes 245, 249 based on the correlation of nodes 245, 257 and the correlation of nodes 249, 261. This carries the information about the router reboot into the application layer represented by the execution path to update the transaction story with the router reboot information. The association of the power failure with the application node 249 and the incorporation of the infrastructure node 259 between application nodes 245, 249 yields an updated transaction story 305. Embodiments do not necessarily incorporate nodes across domains. For example, the analyst evaluation engine 107 could have associated the router reboot information with both application nodes 245, 249 based on a rule or heuristic that makes associations based on neighboring correlations for network device type of infrastructure nodes. With the transaction story 305, the power failure and router reboot have been contextualized into the update inventory transaction type.

Although FIG. 3 refers to an inventory update, a distributed application can provide numerous different types of business transactions. The business transaction types or named use cases for the distributed application being monitored can considered virtual entry points into the domain in which the execution paths travel (e.g., application layer). The transaction stories are created around these virtual entry point constructs to measure the business impact of events that correspond to performance degradation of the business transactions.

The example illustrations of FIGS. 1-3 refer to application and infrastructure domains. However, embodiments can be applied to a greater number of hierarchically related domains. For example, an end user domain may express business level aspects of a transaction and reside above the application domain, such as a Business Process Management System system. A virtualization or containerization domain can reside between the application domain and the infrastructure domain. Furthermore, the domains need not be hierarchically related. A cross-domain analyzer can leverage inter-domain node correlations and does not require a hierarchical relationship to contextualize information with respect to transactions. The topology maps can be generated based on flexible data models that assume no more than 1) nodes to represent entities of a domain, 2) edges to connect nodes based on a relationship between entities, and 3) a field or variable to correlate a node with another topology map. The following flowcharts refer to different domains instead of an application domain and an infrastructure domain to capture the flexibility and adaptivity of the created system.

Figure 4:
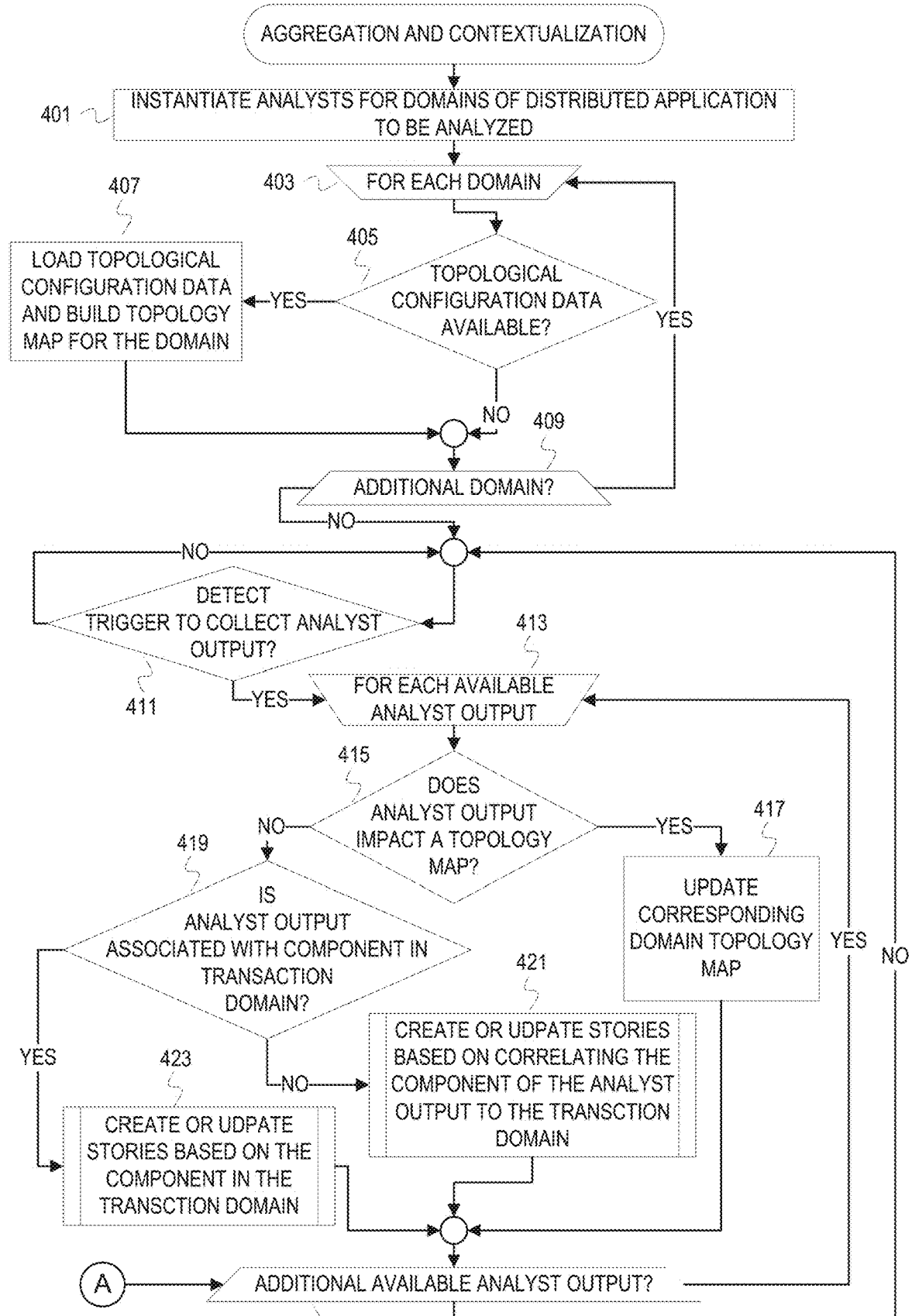
FIG. 4 is a flowchart of example operations for inter-domain event interpretation aggregation and contextualization.

FIG. 4 is a flowchart of example operations for inter-domain event interpretation aggregation and contextualization. As previously stated, analyst outputs can be collected from analysts of different domains and contextualized with respect to a transaction type to provide more insightful information about the impact and/or relationships among events with respect to a transaction type. The analyst outputs may be the events and/or interpretations of the events. Analyst outputs corresponding to nodes on a same execution path for a distributed application are aggregated together to form a story about a type of transaction. The flowcharts will refer to a cross-domain analyzer as performing the operations for consistency with FIG. 1.

The cross-domain analyzer instantiates analysts for domains of a distributed application to be analyzed (401). There is a 1:n relationship between domains and analysts. For instance, an infrastructure domain may have one analyst that collects events from one or more network monitoring tools and another analyst that collects events that indicate performance and utilization of memory and processors of infrastructure computers. The cross-domain analyzer instantiates the analysts on a management server that hosts the cross-domain analyzer. The management server can be part of the infrastructure supporting the distributed application or separate. Instantiation of the analysts can include the formation of at least some of the connections between the various data sources and the analysts.

After instantiation of the analysts, the cross-domain analyzer begins processing information for topology maps of the domains (403). The cross-domain analyzer determines whether topological configuration data is available (405). A data source of a domain may provide topological configuration data or reference to topological configuration data to a corresponding one of the analysts. If topological configuration data is available for a domain, the cross-domain analyzer loads the topological configuration data and builds a topology map for the domain (407). The cross-domain analyzer builds the map with nodes that represent entities/components indicated by the topological configuration data and with edges that represent the relationships between the entities/components indicated in the topological configuration data.

After building topological maps for each domain with available topological configuration data (409), the cross-domain analyzer collects analyst output if available. The cross-domain analyzer can prioritize collection of analyst outputs. For instance, a domain that corresponds to the execution paths in transaction stories (e.g., application domain) can have highest priority. The cross-domain analyzer can maintain a queue of outputs for each of the analysts. The cross-domain analyzer determines whether it detects a trigger to collect analyst output (411). The trigger can be expiration of a time period that guides accessing the queues to check for output or reading flags that indicates changes to queues. The trigger can be interrupt driven. The trigger can also vary depending upon the domain/analyst.

The cross-domain analyzer loops through each available analyst output (413) for transaction story and/or map maintenance. The cross-domain analyzer determines whether the analyst output impacts the domain's topology map (415). As previously discussed, an analyst can indicate in the output or metadata of output whether the output relates to topology. Examples of events that an analyst may deem to impact a topology map include install of a new component, removal of a component, and migration of a component. In addition, a trace or execution path will be determined to impact topology.

If the analyst output impacts the topology map of the domain of the analyst, then the cross-domain analyzer updates a domain topology map that corresponds to the output (417). If a topology map does not yet exist for the domain, then the cross-domain analyzer can create the topology map for the domain based on the output. For example, the analyst output may be a trace or compacted trace that the cross-domain analyzer uses to build an initial topology map for the domain. Other possible updates include adding or removing nodes, adding or removing edges, and updating information of a node or edge (e.g., changing a connection type or software version). After updating the topology map, the cross-domain analyzer would proceed to the next analyst output (425).

If the collected analyst output does not impact a topology map (415), then the cross-domain analyzer determines whether the collected analyst output is associated with a component in a transaction domain (419). To determine whether the analyst output is associated with the transaction domain, the cross-domain analyzer determines whether the analyst that generated the analyst output is of the transaction domain. This can be indicated within the analyst output or indicated, implicitly or explicitly, with the queues hosting the analyst output. The transaction domain is the domain that encompasses transactions. For a distributed application, the application domain is likely the transaction domain. As another example, a virtualization domain may be separate from the application domain. The cross-domain analyzer can be configured to monitor transactions from the virtualization domain. Thus, the virtualization domain would be the transaction domain. If the analyst output is associated with a component in the transaction domain, then the cross-domain analyzer creates or updates one or more transaction stories based on the component in the transaction domain (423), which is explored in FIG. 5. If the analyst output is not associated with the component in the transaction domain, then the cross-domain analyzer creates or updates one or more transaction stories based on correlating the component of the analyst output to the transaction domain (421), which is explored in FIG. 6. After creating or updating a transaction story(ies), the cross-domain analyzer continues processing (or waiting) for additional available analyst output (425).

Figure 5:
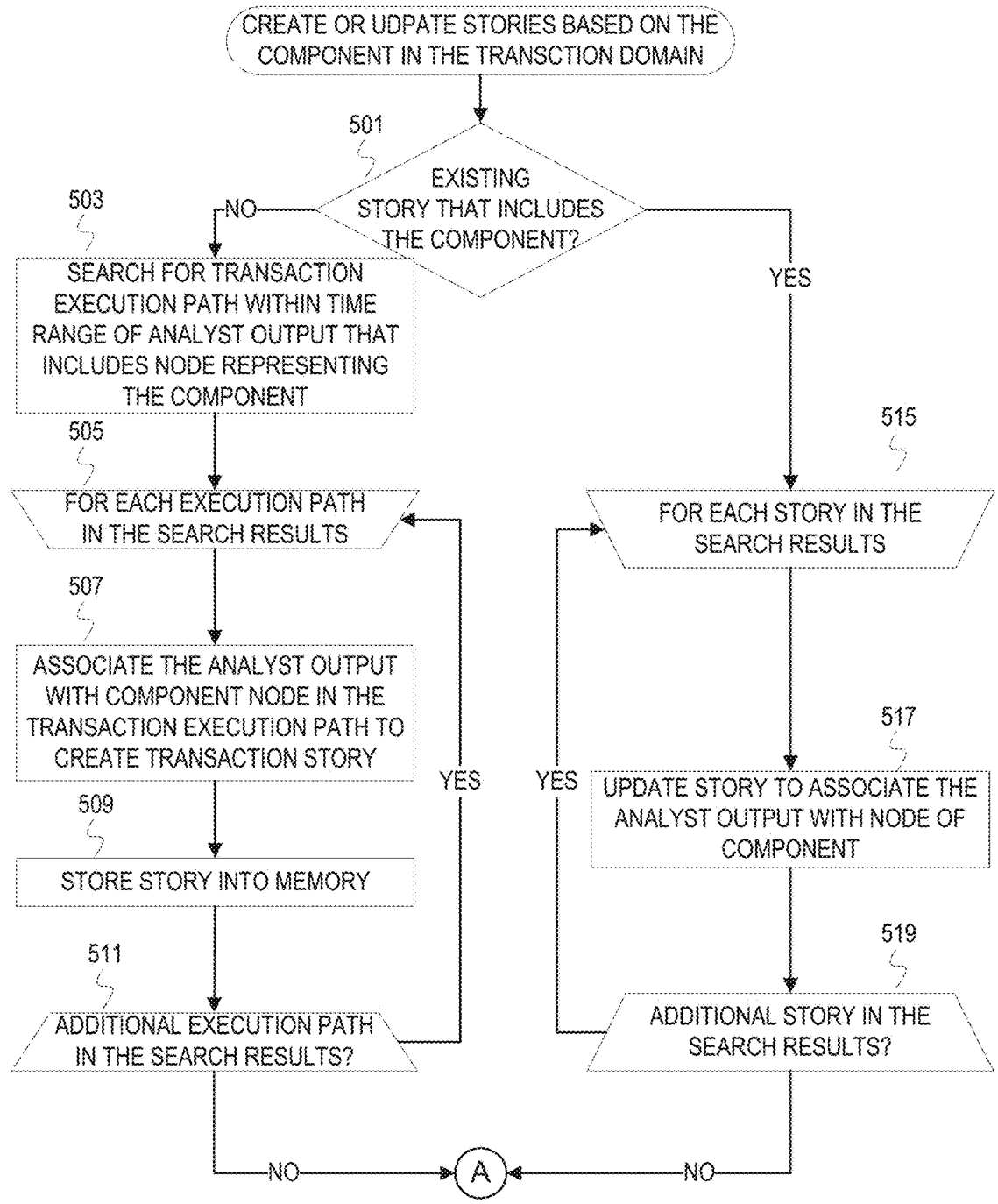
FIG. 5 is a flowchart of example operations for creating or updating transaction stories based on a component in the transaction domain.

FIG. 5 is a flowchart of example operations for creating or updating transaction stories based on a component in the transaction domain. The cross-domain analyzer updates transactions stories based on a component of an analyst output being in the execution path of a transaction story. The cross-domain analyzer can also create a transaction story based on an analyst output. While some transaction stories are enduring (i.e., continue being updated based on ongoing events), others become stale and are removed from or overwritten in the memory that hosts the transaction stories. The stale stories are those without noteworthy events. For example, a type of transaction may not have any events across transaction instances that impact user experience.

After determining a component of an analyst output that corresponds to the transaction domain, the cross-domain analyzer determines whether there is an existing transaction story that includes the component (501). The transaction stories can be keyed off multiple values, one of which is a component identifier. The cross-domain analyzer uses the component identifier of the analyst output to search the transaction stories. The transaction stories can be in a relationship database, key-value store, etc. that is maintained in a working memory that can be accessed quickly (i.e., at a speed that avoids back pressure on the analyst queues).

If there is no existing transaction story, the cross-domain analyzer searches a database or store of execution paths (503). The cross-domain analyzer searches for a transaction execution path within a time range of the analyst output that includes a node that represents the component. This presumes that the analyst output should be associated with a transaction execution path that has been created within a defined time range. The cross-domain analyzer can maintain a database or store of transaction execution paths and expire execution paths after another time period.

For each execution path in the search results (505), the cross-domain analyzer performs a loop of operations to create a transaction story. The cross-domain analyzer associates the analyst output with the component node in the transaction execution path to create the transaction story (507). The component is represented by a node in the transaction execution path. The cross-domain analyzer identifies the representing node based on the component identifier that was used to search the transaction execution paths. Associating the analyst output can be incorporating the analyst output into metadata of the node, creating a data structure of analyst outputs and referencing the data structure from the node, etc.

After associating the analyst output with the node, the cross-domain analyzer stores the transaction story (i.e., the execution path with the associated analyst output) into memory (509). The cross-domain analyzer maintains the transaction stories in a working memory (e.g., memory at a level of memory hierarchy that can be accessed quickly, such as random access memory). The cross-domain analyzer then continues with processing the next execution path in the search results (511) or moves on to the next available analyst output (425).

If the cross-domain analyzer determines that there is an existing story that includes the component of the analyst output (501), then the cross-domain analyzer begins a loop of operations for each story in the search results (515). The cross-domain analyzer updates each resulting story to associate the analyst output with the node that represents the component (517). Based on the component identifier in the analyst output, the cross-domain analyzer identifies the node in the execution path of the story that represents the component corresponding to the analyst output. The cross-domain analyzer then updates the node (i.e., the data structure embodying the node) or a data structure referenced by the node. The node or referenced data structure indicates analyst outputs that have previously been associated with the node. The cross-domain analyzer then proceeds to the next story in the search results if any (519). Otherwise, the cross-domain analyzer continues with processing a next available analyst output (425).

Figure 6:
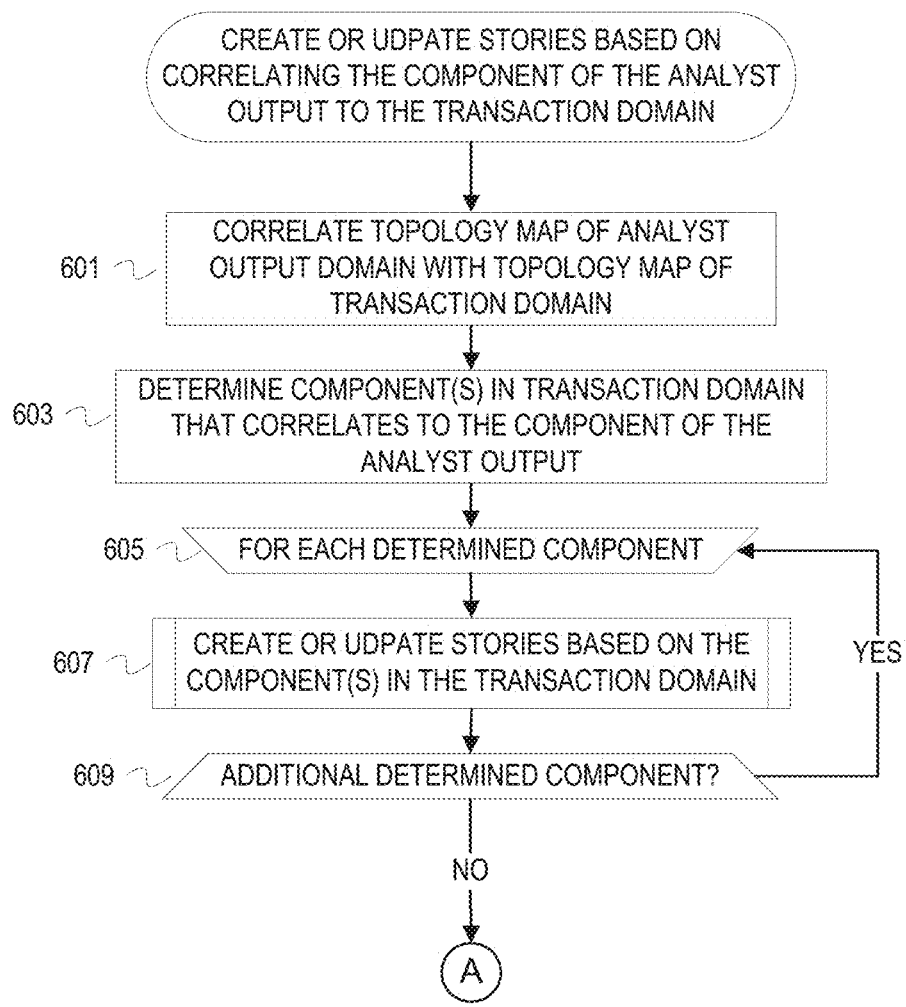
FIG. 6 is a flowchart of example operations for creating or updating transaction stories based on correlating a component in the transaction domain.

FIG. 6 is a flowchart of example operations for creating or updating transaction stories based on correlating a component in the transaction domain. Node/component correlations facilitate the cross-domain analyzer merging analyst output from other domains into transaction stories.

After determining that a component of an analyst output corresponds to a domain that is not in the transaction domain (419), the cross-domain analyzer correlates the topology map of the domain of the analyst that generated the analyst output with the topology map of the transaction domain (601). The cross-domain analyzer can request a join of the topology maps that returns indications of nodes with correlations. As mentioned previously, node correlations can be based on matching host names, matching network addresses, etc. The matching can be full or partial matching depending on the correlating identifier.

After correlating nodes of the topology maps, the cross-domain analyzer determines which component(s) of the transaction domain correlates to the component of the analyst output (603). The cross-domain analyzer can expand correlations beyond those from the map correlation. Some correlations can be made without matching component identifiers. If the node representing the analyst output component does not have a correlation with a node in the transaction domain, then the cross-domain analyzer can traverse the topology map of the analyst output domain to search for neighboring nodes with correlations with the transaction domain. These can be the basis for correlation with the analyst output component node or integrating the analyst output component node into the transaction story despite being from another domain.

Figure 7:
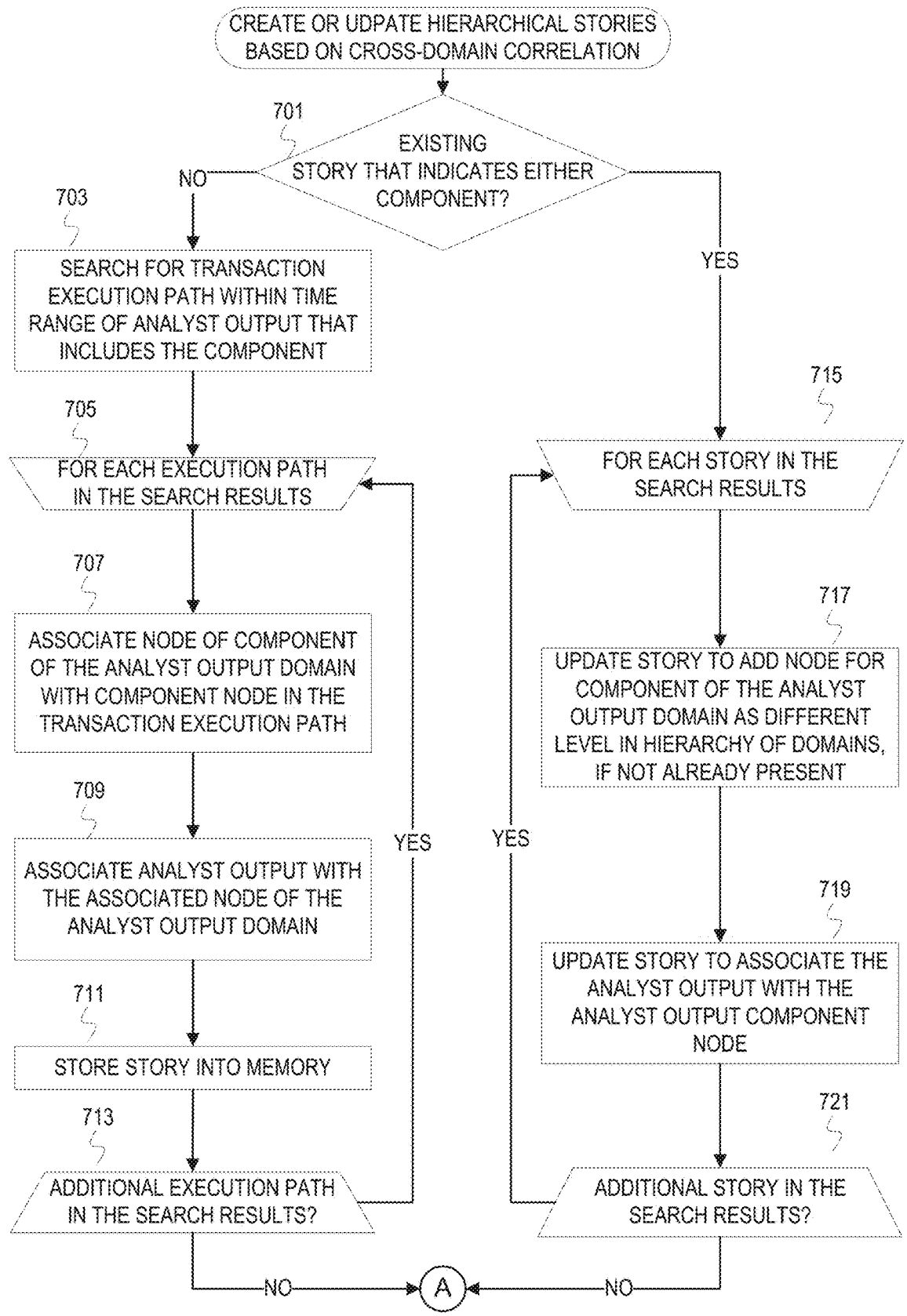
FIG. 7 is a flowchart of example operations for creating or updating hierarchical transaction stories based on a cross-domain correlation.

For each component of the transaction domain determined to have a correlation with the analyst output component (605), the cross-domain analyzer creates or updates the transaction stories based on the transaction domain component (607). The cross-domain analyzer will associate the analyst output of the non-transaction domain with the correlated component in one or more transaction stories. FIG. 5 has already provided example operations for updating/creating transaction stories that inhabit a single domain. FIG. 7 provides an example flowchart for transaction stories that capture a hierarchy of domain maps. The cross-domain analyzer then proceeds with the next transaction domain component that has been correlated with the analyst output component (609). After processing these correlated transaction domain components, the cross domain analyzer proceeds with processing other analyst output (425).

FIG. 7 is a flowchart of example operations for creating or updating hierarchical transaction stories based on a cross-domain correlation. Instead of maintaining transaction stories as execution paths of one domain and migrating information from other domains into that execution path, transaction stories can capture hierarchical domains.

After determining the transaction domain component that correlates to the analyst output component (603), the cross-domain analyzer determines whether there is an existing transaction story in working memory that indicates the correlated transaction domain component or the analyst output component (701). The cross-domain analyzer can prioritize the searching by first searching for indication of the analyst output component. The transaction stories can be keyed off multiple values, one of which is a component identifier.

If there is no existing transaction story, the cross-domain analyzer searches a database or store of execution paths (703). The cross-domain analyzer searches for a transaction execution path within a time range of the analyst output. This presumes that the analyst output should be associated with a transaction execution path that has been created within a defined time range. The cross-domain analyzer searches with the identifier of the transaction domain component that has been correlated with the analyst output component.

For each execution path in the search results (705), the cross-domain analyzer performs a loop of operations to create a transaction story. The cross-domain analyzer associates the component of the analyst output domain with the transaction domain component in the transaction execution path (707). For example, the cross-domain analyzer can create a node that represents the analyst output domain component. The cross-domain analyzer can then add an edge representing an inter-domain correlation between the transaction execution path node and the created analyst output domain node. The cross-domain analyzer can also add any edges between analyst output domain nodes if more than one has been added from the same domain to the transaction execution path.

The cross-domain analyzer then associates the analyst output with the analyst output component node that has been added to the transaction execution path (709). Associating the analyst output can be incorporating the analyst output into metadata of the analyst output component node, creating a data structure of analyst outputs and referencing the data structure from the node, etc.

After associating the analyst output with the node, the cross-domain analyzer stores the transaction story (i.e., the execution path with the associated analyst output) into working memory (711). The cross-domain analyzer then continues with processing the next execution path in the search results (713) or moves on to the next available analyst output (425).

If the cross-domain analyzer determines that there is an existing story that indicates the transaction domain component or the analyst output component (701), then the cross-domain analyzer begins a loop of operations for each story in the search results (715). The search results could be a mixture of transaction stories that indicate one component but not the other and stories that indicate both components. The cross-domain analyzer updates each story to add the component of the analyst output domain as a different level in the hierarchy of domains if not already present (717). As described above, the cross-domain analyzer can create a node representing the analyst output component and connect the created node with the transaction component node with an edge that indicates the relationship as an inter-domain correlation. The cross-domain analyzer may examine the transaction story to determine whether the domain of the analyst output is already represented. Metadata for the story can indicate which domains are represented or the individual nodes can indicate the domains. If the analyst output domain is already represented, then the cross-domain analyze can add the analyst output component node to the level of nodes already present in the transaction story that represent the analyst output domain.

After updating the transaction story to add the node that represents the analyst output component or if the analyst output component node is already present, the cross-domain analyzer updates the transaction story to associate the analyst output with the added node (719). The cross-domain analyzer updates the node (i.e., the data structure embodying the node) or a data structure referenced by the node. The node or referenced data structure indicates analyst outputs that have previously been associated with the node. The cross-domain analyzer then proceeds to the next story in the search results if any (721). Otherwise, the cross-domain analyzer continues with processing a next available analyst output (425).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations to create or update a hierarchical transaction story as depicted in FIG. 7 can be different by searching for the correlated transaction domain component in transaction stories before searching for the analyst output component. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that can communicate, propagate, or transport a program for use by or in connection with an instruction execution system, apparatus, or device, but is not a machine-readable storage medium.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 8:
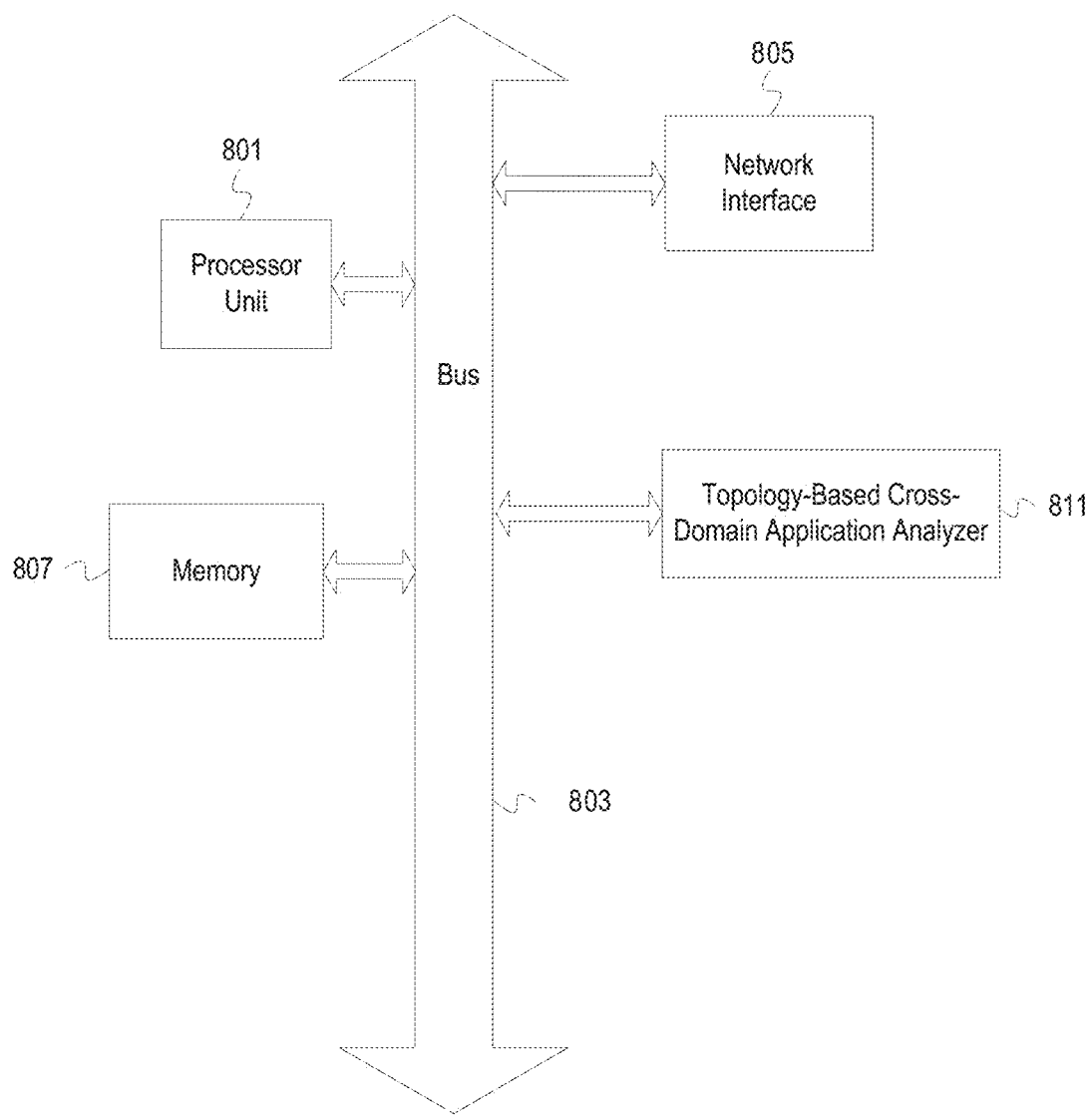
FIG. 8 depicts an example computer system with a topology-based domain transversal application analyzer.

FIG. 8 depicts an example computer system with a topology-based transversal application analyzer. The computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, magnetic memory, etc.) or any one or more of the above already described possible realizations of machine-readable media. The computer system also includes a bus 803 (e.g., PCI, ISA, PCI-Express, HyperTransport® bus, InfiniBand® bus, NuBus, etc.) and a network interface 805 (e.g., a Fiber Channel interface, an Ethernet interface, an internet small computer system interface, SONET interface, wireless interface, etc.). The system also includes a topology-based domain transversal application analyzer 811. The topology-based domain transversal application analyzer 811 generates transaction stories by aggregating instances of transactions by transaction type and contextualizing event based information from multiple domains of a distributed application into execution paths of the aggregations. The topology-based domain transversal application analyzer 811 allows event based information from multiple domains to be contextualized into these transaction stories by correlating topology maps of the different domains to determine how to migrate or communicate event based information of the various domains to a domain of the transactions. Any one of the previously described functionalities may be partially (or entirely) implemented in hardware and/or on the processor unit 801. For example, the functionality may be implemented with an application specific integrated circuit, in logic implemented in the processor unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

While the aspects of the disclosure are described with reference to various implementations and exploitations, it will be understood that these aspects are illustrative and that the scope of the claims is not limited to them. In general, techniques for cross-domain transaction contextualization of event based information as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   correlating a first topology map for a distributed application with a second topology map for the distributed application, wherein the first topology map comprises software nodes that represent software components of the distributed application and the second topology map comprises infrastructure nodes that represent infrastructure components that support the distributed application; and
   for a first aggregate of distributed traces for a first transaction type of the distributed application:
      detecting first event information of a first infrastructure node at a first time,
      detecting second event information of a first software node at a second time,
      determining that the first event information corresponds to the second event information based on (i) the correlation of the first topology map with the second topology map identifying an association between the first infrastructure node and the first software node, and (ii) the first time and the second time being within a defined range of time of each other, and
   associating the first event information with the second event information in the first aggregate.

2. The method of claim 1, wherein correlating the topology maps comprises determining host identifiers associated with the software nodes and with the infrastructure nodes, wherein the correlating is based, at least in part, on the determined associations with the host identifiers.

3. The method of claim 1 further comprising:
   based on detection of the first event information, determining that the first event information corresponds to the first infrastructure node and determining that the first infrastructure node correlates to the first software node of the first topology map; and
   determining that the first event information corresponds to a first transaction instance of the first transaction type based, at least in part, on the first time of the first event information and a time of the first transaction instance.

4. The method of claim 3 further comprising retrieving the first aggregate of distributed traces based, at least in part, on determining that the first event information corresponds to the first transaction instance of the first transaction type.

5. The method of claim 1, further comprising associating the first event information with the first software node in the first aggregate.

6. The method of claim 1, further comprising:
   retrieving the first aggregate based, at least in part, on the first event information corresponding to the first transaction type; and
   searching the first aggregate for event information within the defined range of time with respect to the second event information.

7. The method of claim 1 further comprising:
   correlating the first topology map with a third topology map which comprises virtualization nodes that represent virtualization components; and
   associating the first event information with a first virtualization node based, at least in part, on the correlating.

8. One or more non-transitory machine-readable media comprising program code for cross-domain contextualizing of event information with respect to different types of transactions of a distributed application, the program code comprising instructions to:
    correlate a first topology map for a distributed application with a second topology map for the distributed application, wherein the first topology map comprises nodes that represent components of a transaction domain and the second topology map comprises nodes that represent components of a first non-transaction domain; and
    for a first aggregate of distributed traces for a first of the different transaction types of the distributed application:
        detecting first event information of a first transaction domain node at a first time,
        detecting second event information of a first non-transaction domain node at a second time,
        determining that the first event information corresponds to the second event information based on (i) the correlation of the first topology map with the second topology map identifying an association between the first transaction domain node and the first non-transaction domain node, and (ii) the first time and the second time being within a defined range of time of each other, and
        associating the first event information with the second event information in the first aggregate.

9. The non-transitory machine-readable media of claim 8, wherein the instructions to correlate the topology maps comprise instructions to determine host identifiers associated with the transaction domain nodes and non-transaction domain nodes, wherein the correlation is based, at least in part, on the determined associations with the host identifiers.

10. The non-transitory machine-readable media of claim 8 further comprising instructions to:
    based on detection of the first event information, determine which of the non-transaction domain nodes corresponds to the first event information and which of the transaction domain nodes corresponds to the determined one of the non-transaction domain nodes, wherein the determined one of the non-transaction domain nodes is the first non-transaction domain node; and
    determine that the first event information corresponds to a first transaction instance of the first transaction type based, at least in part, on the first time of the first event information and a time of the first transaction instance.

11. The non-transitory machine-readable media of claim 10 further comprising program code to retrieve the first aggregate of distributed traces based, at least in part, on a determination that the first event information corresponds to the first transaction instance of the first transaction type.

12. The non-transitory machine-readable media of claim 8, wherein the program code to associate the first event information with the first aggregate comprises program code to associate the first event information with the first transaction domain node in the first aggregate.

13. The non-transitory machine-readable media of claim 8 further comprising program code to: retrieve the first aggregate based, at least in part, on the first event information corresponding to the first transaction type; and search the first aggregate for event information within the defined range of time with respect to the second event information.

14. The non-transitory machine-readable media of claim 8 further comprising program code to:
    correlate the first topology map with a third topology map which comprises nodes that represent components of a second non-transaction domain; and
    associate the first event information with a first node of the second non-transaction domain based, at least in part, on the correlation of the first and third topology maps.

15. An apparatus comprising:
    a processor;
    a network interface; and
    a machine-readable medium comprising program code for cross-domain contextualizing of event information with respect to different types of transactions of a distributed application, the program code executable by the processor to cause the apparatus to:
        correlate a first topology map for a distributed application with a second topology map for the distributed application, wherein the first topology map comprises nodes that represent software components of the distributed application and the second topology map comprises infrastructure nodes that represent infrastructure components that support the distributed application;
        detect first event information corresponding to at least one of the infrastructure components at a first time;
        detect second event information corresponding to at least one of the software components at a second time; and
        determining that the first event information corresponds to the second event information based on (i) the correlation of the first topology map with the second topology map identifying an association between the at least one of the infrastructure components and the at least one of the software components, and (ii) the first time and the second time being within a defined range of time of each other;
        based on detection of the first event information corresponding to at least one of the infrastructure components, determine a first of the different transaction types that corresponds to the first event information and a first of a plurality of aggregates of distributed traces that corresponds to the first transaction type; and
        associate the first event information and the second event information with the first aggregate based, at least in part, on the correlation of the topology maps and the determination that the first event information corresponds to the second event information.

16. The apparatus of claim 15, wherein the program code to correlate the topology maps comprises program code to determine component identifiers associated with the software nodes and infrastructure nodes, and wherein the correlation is based, at least in part, on the determined associations with the component identifiers.

17. The apparatus of claim 16, wherein the program code further comprises program code executable by the processor to cause the apparatus to:
    determine that the first event information corresponds to a first transaction instance of the first transaction type based, at least in part, on the first time of the first event information corresponding to a third time of the first transaction instance; and
    associate the first event information with the first aggregate based, at least in part, on a determination that the first event information corresponds to the first transaction instance.

* * * * *